Jan. 30, 1940.  J. G. JACKSON ET AL  2,188,550
BAKING PAN SET CONSTRUCTION
Filed May 12, 1937    2 Sheets-Sheet 1
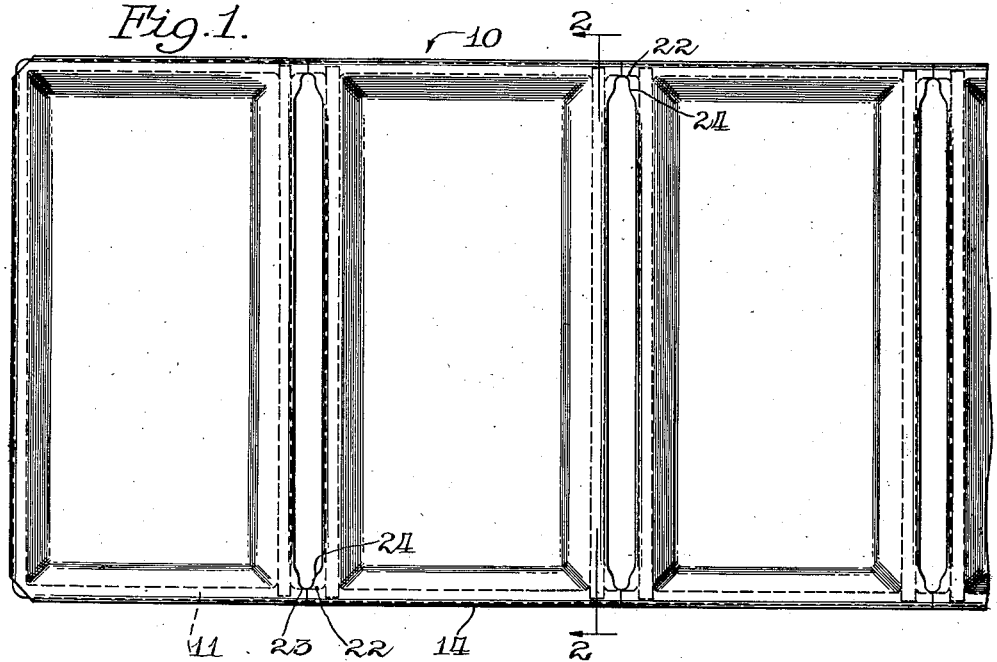
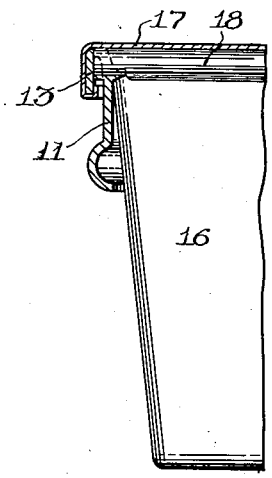
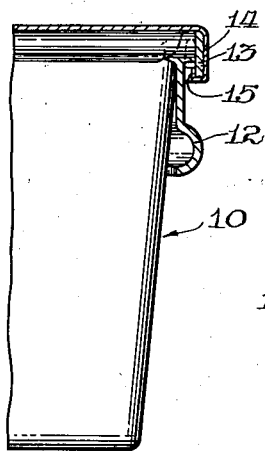
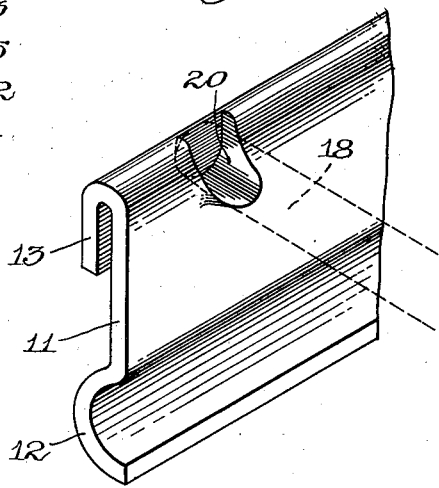
Inventors.
Jacob Kollman
Joseph G. Jackson
By Stanley Howds
Att'y.

Jan. 30, 1940.                J. G. JACKSON ET AL                2,188,550
                           BAKING PAN SET CONSTRUCTION
                             Filed May 12, 1937            2 Sheets-Sheet 2
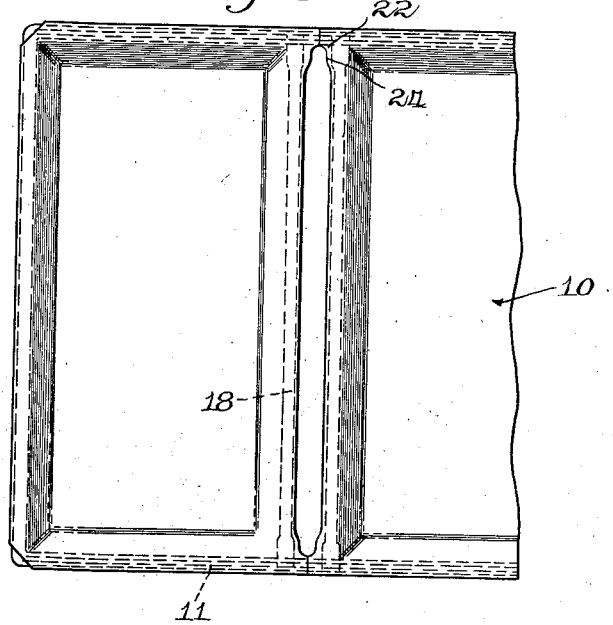
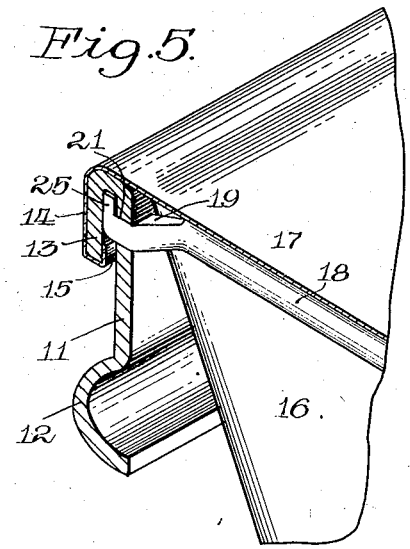
Inventor
Jacob Kollman
Joseph G. Jackson
By Stanley Hood
       Att'y.

Patented Jan. 30, 1940

2,188,550

UNITED STATES PATENT OFFICE 2,188,550

BAKING PAN SET CONSTRUCTION

Joseph G. Jackson, Oak Park, and Jacob Kollman, Chicago, Ill.; said Jackson assignor to The Edward Katzinger Company, Chicago, Ill., a corporation of Illinois Application May 12, 1937, Serial No. 142,106

13 Claims. (Cl. 53—6)

This invention relates to new and useful improvements in baking pan sets wherein a plurality of baking pans are secured one to the other in the form of a multiple unit baking pan set and has for its object the creation of beads at the edges of the adjacent walls of adjoining pans, the creation of which will not only reinforce the edges of the pan walls but will also act to maintain the spaced relationship of the pans and at the same time reinforce the means by which the pans are secured one to the other in the form of a pan set.

With the above and other objects in view, as will be apparent, this invention consists in the construction, combination and arrangement of parts, all as hereinafter more fully described, claimed and illustrated in the accompanying drawings, wherein:

Fig. 1 is a fragmentary plan view of the adjoining portions of pans included in a pan set incorporating the present invention;

Fig. 2 is a fragmentary longitudinal section taken along line 2—2 of Fig. 1 through the pan set; and Fig. 3 is an enlarged fragmentary detail view of strap and wire connection embodying the principles of this invention.

Fig. 4 is a view similar to Fig. 1 showing in dotted line a modified type of wire construction.

Fig. 5 is an enlarged fragmentary detail view of the strap and wire connection contemplated in Fig. 4.

Baking pan sets are well known in the art and may be generally said to consist of a plurality of individual baking pans secured one to the other in spaced parallel relation by any one of a variety of means. In many instances the individual pans of the set are secured one to the other in spaced relationship by means of a strap formed into a frame bearing against the exposed or outer walls of the pans and secured thereto whereby the pans have their exposed walls reinforced and are rigidly secured together into a unitary set. The pans being spaced one from the other it is necessary to reinforce and support the adjoining walls of the pans so that they will not become distorted or bulged.

The present invention contemplates the rigid reinforcement of the adjoining walls of the spaced pans which reinforcement will prevent the distortion of said adjoining walls and at the same time create an outstanding bead along the edges of the walls. Furthermore, the present invention has in view the reinforcement of the strapping surrounding all of the pans of the set at the points corresponding to the spaces between adjoining pans.

Reference being had more particularly to the drawings, 10 designates a baking pan of any suitable construction such as either seamless or a folded type of pan. A plurality of these baking pans are arranged side by side in spaced relationship and are connected together by a frame which surrounds all of the pans 10 which go to make up the set. This frame comprises a strap 10, 11 resting substantially flush against the exposed walls of the pans 10 and having a reinforced bead 12 along its lower edge. The upper edge of the strap is bent outwardly and downwardly, as at 13, to create a hook resting substantially parallel to the body of the strap 11. To secure the strap 11 against displacement and to the walls of the pans 10, the exposed walls of the pans 10 are provided at their edges with flanges 14 which are bent outwardly over the upper edges 20 of the straps 11 and then downwardly along the outer surfaces of the hooks 13 of said straps so that their edges 15 will be engaged under and behind the edges of the hooks 13. Except at the points corresponding to the spaces between the pans, the flange 14 and hook 13 are pressed inwardly to rest substantially flush against the outer surface of the strap 11 so that the edge 15 of the flange 14 is there securely gripped and at all points around the pan set the strap 11 is rigidly and firmly secured to the pans by means of the flanges 14. At the points corresponding to the spaces between the pans the hook 13 and the flange 14 are slightly spaced from the outer face of the strap 11 by the reinforcing means coacting with the adjacent walls of adjoining pans 10, hereinafter to be more fully described.

The adjoining walls 16 of adjacent pans of the set are provided with flanges 17 at their upper edges similar to the flanges 14 upon the exposed walls of the pans 10. Each of these flanges 17 is bent outwardly and downwardly about a reinforcing wire 18 which extends, exteriorly of the wall 16 from one strap 11 to the opposed strap 11 and in so engaging such reinforcing wire creates an outstanding bead at the edge of the pan wall 16. Pockets or grooves 20 are created by swaging or other suitable means in the inner layer of the straps 11 in alignment with the body of the wire 18. The end portions of the wires 18 are seated in these grooves 20 to rest flush between the outer surface of the inner layer of the strap 11 and the deformed inner surface of the hook 13. In this manner the ends of each wire are backed up by the material of the strap to provide a rigid and permanent connection between the wire 18 and the strap 11.

It will be observed from Figs. 1 and 2 that the flanges 14 on the end walls are provided with extensions 22 that cooperate with those portions of the strap 11 corresponding to the spaces between exposures and that the flanges 17 on the edges of adjoining pan walls merge with the extensions 22, as at 24. Thus the ends of the reinforcing wires 18 are completely covered by the extensions 22 of the flanges 14 in conjunction with the flanges 17 of the adjoining walls of the pan. To prevent the exposure of rough metallic edges, the inner edges of the extensions 22 and of the portions 24 connecting them with the flanges 17, are bent downwardly and inwardly as at 23. Thus at the points corresponding to the spaces between pans, the inner edges 23 of the extensions 22 bear against the inner faces of the strap 11.

As a modification of the wire and strap connection, Fig. 5 discloses reinforcing wires 18 terminating adjoining the inner faces of the straps 11 to the rear of the hooks 13 and there being reduced and flattened, as at 19. Openings 21 are created in the strap 11 to the rear of the hook 13 but below the level of the wire 18. The reduced portions 19 of the wires 18 are inserted in these openings 21 and thus pass through the strap 11. The outer ends of these portions 19 of the wires 18 beyond the strap 11 are bent upwardly as at 25 to rest flush between the outer surface of the strap 11 and the inner surface of the hook 13. When the hook 13 of the strap and the flange 14 of the pan wall are bent inwardly as above described, the inner surface of the hook 13 will grip the angularly bent ends 25 of the wires 18 and firmly engage them between the strap 11 and the hook 13. In this manner the ends of each wire 18 are rigidly and permanently secured to the straps 11.

From the foregoing, it is manifest that the edges of the adjoining walls of adjacent pans are fully reinforced and protected from bulging and distortion by the wires 18 which are held from displacement by their engagement at their ends with the strap 11. Furthermore, by having the straps 11 connected to or contacted with the ends of the wires 18, the straps are reinforced at those portions corresponding to the spaces between pans and the wires 18 in connecting with the straps 11 so reinforce the entire pan structure that lateral distortion and twisting is eliminated.

What is claimed is:

1. The combination with a plurality of spaced baking pans, of a strap having apertures therein at points corresponding to the spaces between pans, wires at the edges of the adjacent walls of adjoining pans having their terminals seated in the apertures aforesaid and bent at their ends to rest against the outer faces of the straps aforesaid, and means on said straps for covering the bent terminals of said wires.

2. The combination with a plurality of spaced baking pans, of a strap having apertures therein at points corresponding to the spaces between pans, each opening being in substantial alignment with one of the adjacent walls of adjoining pans, wires extending from one strap to the other, said wires being flattened at their ends and seated in the apertures aforesaid, and means on said adjacent walls of adjoining pans for engaging said wires.

3. The combination with a plurality of spaced baking pans, of a strap having apertures therein at points corresponding to the spaces between pans, each opening being in substantial alignment with one of the adjacent walls of the adjoining pans, wires extending from one strap to the other, said wires being flattened at their ends and seated in the apertures aforesaid and bent at their terminals to bear against the outer surface of said strap, and flanges at the edges of the adjacent walls of adjoining pans for engaging said wires.

4. The combination with a plurality of spaced baking pans, of a strap having apertures therein at points corresponding to the spaces between pans, each opening being in substantial alignment with one of the adjacent walls of adjoining pans, wires extending from one strap to the other, said wires being flattened at their ends and seated in the apertures aforesaid and bent at their terminals to bear against the outer surface of said strap, flanges at the edges of the adjacent walls of adjoining pans for engaging said wires, and hooks on one of the edges of said strap to cover the bent terminals of the wires aforesaid.

5. The combination with a plurality of spaced baking pans, of a strap having apertures therein at points corresponding to the spaces between pans, each opening being in substantial alignment with one of the adjacent walls of the adjoining pans, wires extending from one strap to the other, said wires being flattened at their ends and seated in the apertures aforesaid and bent at their terminals to bear against the outer surface of said strap, flanges on the exposed walls of said pans to engage said straps, and extensions on said flanges to cover the upper edge of the strap at the points corresponding to the spaces between the pans.

6. In a baking pan set the combination with a plurality of spaced pans, of a strap positioned against the exposed walls of said pans having apertures therein at the points corresponding to the spaces between the pans, each aperture being aligned with one of the adjacent walls of adjoining pans, wires flattened at their terminals and bent to pass through the apertures aforesaid and being bent laterally at their terminals to bear against the outer face of the strap, and flanges on the edges of the adjacent walls of adjoining pans bent to engage said wires.

7. In a baking pan set the combination with a plurality of spaced pans, of a strap positioned against the exposed walls of said pans having apertures therein at the points corresponding to the spaces between the pans, each aperture being aligned with one of the adjacent walls of adjoining pans, wires flattened at their terminals and bent to pass through the apertures aforesaid and bent laterally at their terminals to bear against the outer face of the strap, flanges at the edges of the adjacent walls of adjoining pans to engage the wires aforesaid, a hook formed at one edge of the strap aforesaid and extending over the bent terminals of the wires aforesaid, and flanges on the exposed walls of said pans to engage the hook aforesaid.

8. In a baking pan set the combination with a plurality of spaced pans, of a strap positioned against the exposed walls of said pans having apertures therein at the points corresponding to the spaces between the pans, each aperture being aligned with one of the adjacent walls of adjoining pans, wires flattened at their terminals and bent to pass through the apertures aforesaid and bent laterally at their terminals to bear against the outer face of the strap, flanges at the edges of the adjacent walls of adjoining pans to engage the wires aforesaid, a hook formed at one edge of the strap aforesaid, and extending over the bent terminals of the wires aforesaid, flanges at the edges of the exposed walls of said pans bent to engage the hook aforesaid, and extensions at the ends of said flanges bent inwardly to cover the exposed edge of the strap at points corresponding to the spaces between the pans.

9. The combination with a plurality of spaced baking pans, of a strap having apertures therein at points corresponding to the spaces between pans, wires at the edges of the adjacent walls of adjoining pans having their terminals seated in the apertures aforesaid, said straps having an outwardly and downwardly bent portion in alignment with said apertures, the innermost face of which portion is substantially flush against the outermost end of the wires aforesaid.

10. The combination with a plurality of spaced baking pans, of a strap having apertures therein at points corresponding to the spaces between pans, wires at the edges of the adjacent walls of adjoining pans having their terminals seated in the apertures aforesaid, said straps having an outwardly and downwardly bent portion in alignment with said apertures, the innermost face of which portion is substantially flush against the outermost end of the wires aforesaid, and means on said adjacent walls of adjoining pans for engaging said wires.

11. The combination with a plurality of spaced baking pans, of a strap having apertures therein at points corresponding to the spaces between pans, wires at the edges of the adjacent walls of adjoining pans having their terminals seated in the apertures aforesaid, said straps having an outwardly and downwardly bent portion in alignment with said apertures, the innermost face of which portion is substantially flush against the outermost end of the wires aforesaid, flanges on the exposed walls of said pans to engage said straps, extensions on said flanges to cover the upper edge of the strap at the points corresponding to the spaces between the pans, and means on said adjacent walls of adjoining pans for engaging said wires.

12. The combination with a plurality of spaced baking pans, of a strap having apertures therein at points corresponding to the spaces between pans, each opening being in substantial alignment with one of the adjacent walls of the adjoining pans, wires extending from one strap to the other, each wire coacting with one of the adjacent walls of the adjoining pans, said wires being flattened at their ends and seated in the apertures aforesaid and bent upwardly at their terminals to bear against the outer surface of said strap, and hooks on one of the edges of said strap to cover the bent terminals of the wires aforesaid.

13. In a baking pan set the combination with a plurality of spaced pans, of a strap coacting with the outer exposed walls of said pans and having its upper edge bent outwardly and downwardly to create a hook resting substantially parallel to the body of the strap, flanges on the edges of the exposed walls of the pans bent outwardly and downwardly for engagement of the outer edges thereof under and behind the edges of said hook, reinforcing members at the edges of the adjacent walls of adjoining pans having end portions extending outwardly beyond the inner limits of the body of said strap, and upwardly facing grooves formed in and partially intersecting the bent edge of said strap to create a seat for the projecting end portions of said reinforcing members and a transverse shoulder between the hook and the outermost ends of said reinforcing members.

JOSEPH G. JACKSON.
JACOB KOLLMAN.